Oct. 11, 1966     F. X. BUSCHMAN ETAL     3,277,525
APPARATUS FOR PRODUCING SHRINKABLE PLASTIC TUBING
Filed Nov. 19, 1963     2 Sheets-Sheet 1
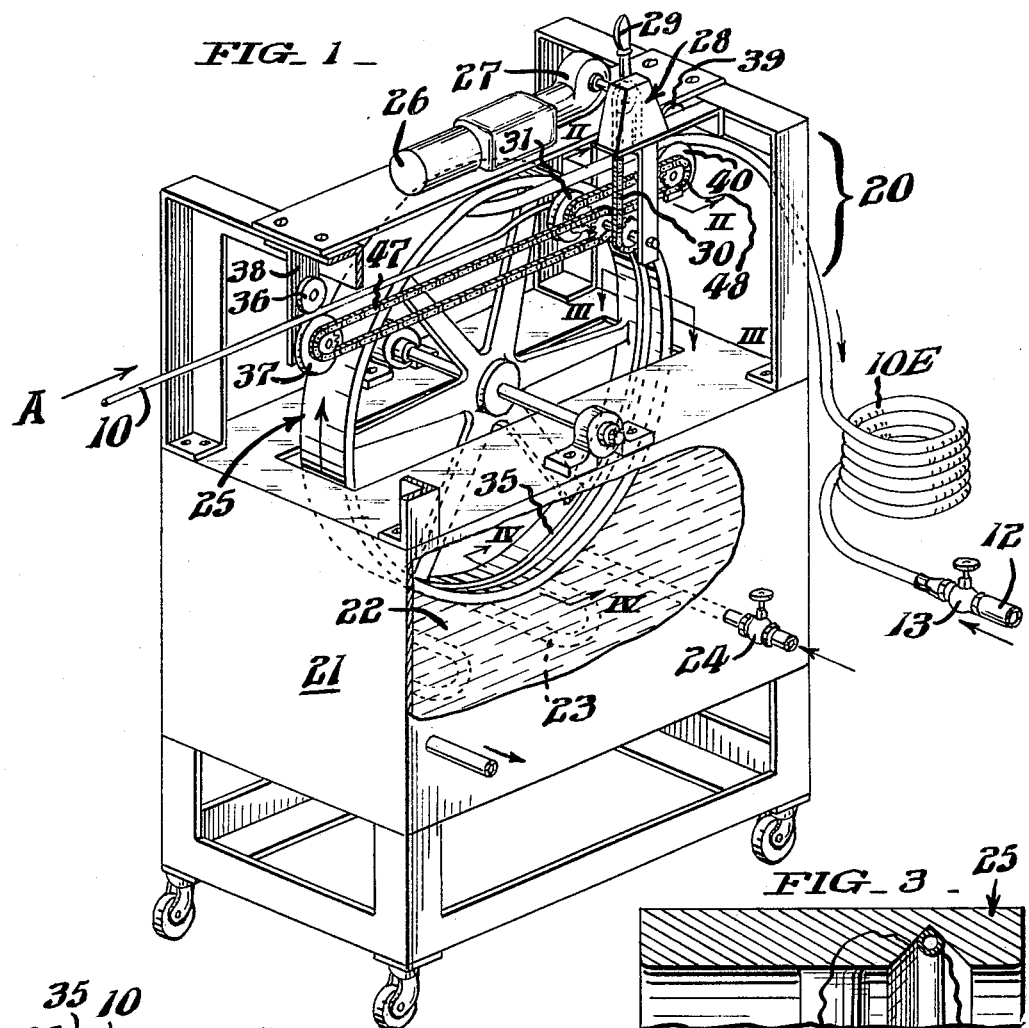
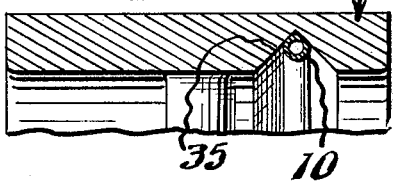
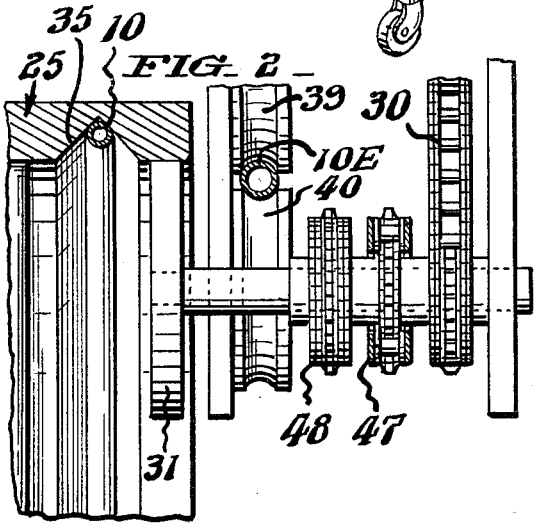
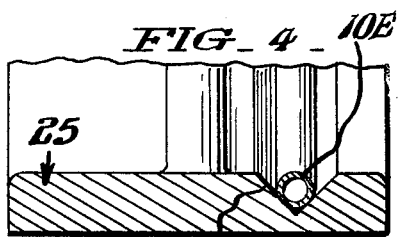
INVENTORS.
Francis X. Buschman
& Richmond S. Parsons
BY Paul & Paul
ATTORNEYS.

Oct. 11, 1966     F. X. BUSCHMAN ETAL     3,277,525
APPARATUS FOR PRODUCING SHRINKABLE PLASTIC TUBING
Filed Nov. 19, 1963     2 Sheets-Sheet 2
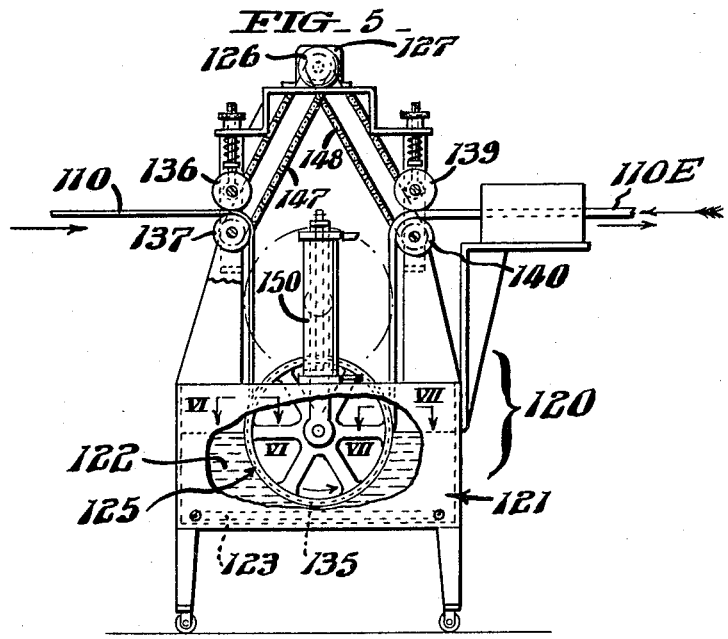
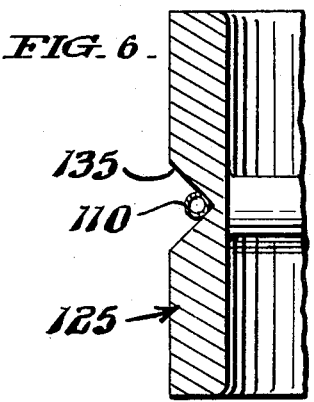
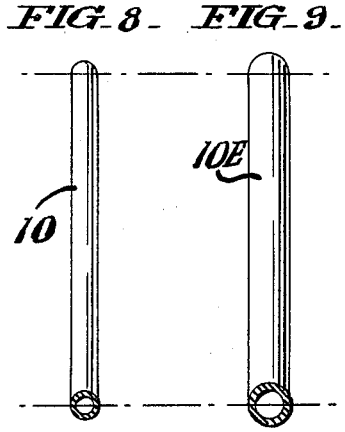
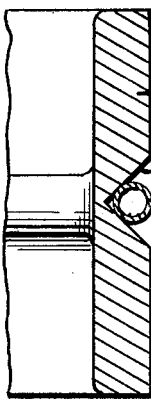
INVENTORS.
Francis X. Buschman
& Richmond S. Parsons,
BY Paul & Paul
ATTORNEYS.

United States Patent Office 3,277,525
Patented Oct. 11, 1966

3,277,525
APPARATUS FOR PRODUCING SHRINKABLE PLASTIC TUBING
Francis X. Buschman, Worcester, and Richmond S. Parsons, Warminster Pa., assignors to L. Frank Markel & Son, Inc., Norristown, Pa., a corporation of Pennsylvania
Filed Nov. 19, 1963, Ser. No. 324,649
2 Claims. (Cl. 18—6)

This invention relates to apparatus for producing shrinkable plastic tubing.

It is known that certain plastic materials particularly polymeric materials, have what is commonly referred to as a memory characteristic. If such materials are stretched while subjected to heat at an elevated temperature, the material will retain its stretched or enlarged size under low or normal temperature conditions but will tend to return or shrink back to its original size when subjected to heat at a temperature equal to that at which the stretching occurred.

Considerable demand exists commercially for plastic tubing which will shrink substantially in diameter or cross-section when subjected to a moderately high temperature. One example of such demand is in connection with the wiring up of electronic or electrical circuits. Here a demand exists for plastic tubing of short length which may be drawn over the spade or other electrical terminal to embrace both the inner end of the terminal and the end of the connecting wire, and which by the application of a modest amount of heat will shrink into a tight fit about the wire and the terminal. In this manner, the connection between the wire and the terminal becomes well covered and insulated. This is but one of many examples of uses for shrinkable plastic tubing.

In many of the applications for shrinkable plastic tubing, it is desired that the tubing shrink drastically in diameter or cross-section without shrinking appreciably in length. This is the problem to which the present invention is directed. The principal object of the present invention is then to provide apparatus for producing a shrinkable plastic tubing which, when heated to its critical temperature, will shrink very substantially in diameter or cross-section without shrinking appreciably in its lengthwise dimension.

The present invention will be clearly understood from the following detailed description taken together with the drawings in which:

FIG. 1 is a perspective diagram illustrating one form of apparatus for carrying out the present invention;

FIG. 2 is a view in section looking horizontally along the line II—II of FIG. 1;

FIG. 3 is a view in section looking down along the line III—III of FIG. 1;

FIG. 4 is a view in section looking horizontally along the line IV—IV of FIG. 1;

FIG. 5 is a diagrammatic elevational view of another form of apparatus embodying the invention;

FIGS. 6 and 7 are views in section looking down along the lines VI—VI and VII—VII, respectively, FIG. 8 shows a length of tubing before expansion; and FIG. 9 shows the same piece of tubing after it has been expanded radially by the method and apparatus of the present invention.

Referring now to FIG. 1, the plastic tubing 10, which is to be expanded radially by the method and apparatus of the present invention, may be formed from any one of the well known polymeric materials which exhibit elastomeric properties. Such materials include polyethylene, polypropylene, polytetrafluoroethylene, polyvinyl chloride, and others.

The tubing 10, in FIG. 1, is shown as being fed, in the direction of the arrow A, from a supply drum or reel not shown, into one side of the apparatus identified comprehensively by the reference numeral 20. The tubing is delivered from the other side of the apparatus 20 radially but not axially expanded. The expanded tubing 10E may then be wound on a drum or reel for storage and shipment. In FIG. 1, the expanded tubing 10E is illustrated as merely being coiled on the floor.

To expand the tubing 10 radially, pressure is applied to the bore of the tubing. In FIG. 1, compressed air from a source 12 is illustrated as being supplied, through a valve 13, to the delivery end of the expanded tubing 10E. However, the compressed air could just as well be supplied to the supply end of the tubing 10. In either case, the other end of the tubing is blocked, as by clamping. In lieu of air or gas pressure for expanding the tubing radially, liquid pressure could be used.

The application of gas or liquid pressure to the bore of the tubing 10 is not sufficient to expand the tubing radially so long as the temperature of the tubing is lower than a critical temperature. The tubing may be raised to such critical temperature by any suitable heating means.

In FIG. 1, the apparatus 20 includes a tank 21 containing a liquid 22, preferably water, which is heated as by the steam coil 23 supplied with steam through the valve 24. The liquid 22 is maintained at a temperature sufficiently high to achieve the desired radial expansion of the tubing 10 during the time period of its immersion in the liquid 22. The critical temperature is a function of the tubing material, the air (or liquid) pressure applied, and the rate of movement of the tubing through the bath.

In accordance with the present invention, the tubing 10 is transported or carried, not pulled or pushed, through the heated liquid 22. Thus, axial tension which would tend to extend the tubing lengthwise, is avoided. Further, the transport means is so designed that extension of the tubing axially is actually opposed or resisted. This feature will be described more fully below.

In the apparatus of FIG. 1, the means for transporting the tubing 10 through the heated liquid 22 is a wheel 25 driven rotationally by any suitable drive means. In FIG. 1, the particular drive means illustrated includes the electric motor 26, reduction gearing 27, clutch mechanism 28 (controlled by clutch lever 29) and sprocket and chain means 30 for driving the friction-drive disk 31. Disk 31 frictionally engages the inner surface of the rim of the wheel 25.

It is to be understood that the particular means shown in FIG. 1 for driving the wheel 25 is merely an example of one form of drive means, and that, so far as the present invention is concerned, any suitable drive may be used. For example, the drive may be applied to the axial shaft or hub of the wheel 25, rather than to the rim.

In accordance with the present invention, the inner surface of the rim of wheel 25 is provided with a circumferential notch or groove 35 for receiving the tubing 10. Notch 35 is preferably angle-shaped, referred to hereinafter for convenience as V-shaped. The tubing may be guided into the groove 35 by one or more pairs of guide rollers, such as guide rollers 36 and 37 mounted on support bracket 38. The roller 37 may be driven, as by the sprocket and chain 47.

The expanded tubing 10E may be guided from the groove 35 by one or more other pairs of guide rollers, such as rollers 39 and 40. The lower roller 40 may be driven, as by the sprocket and chain 48. The upper rollers of each pair of guide rollers, such as 36 and 39, may preferably be spring loaded downwardly.

The tubing 10 is fed through input guide rollers 36, 37 into the circumferential angle-shaped or V-shaped groove 35 of the wheel 25. The tubing enters the groove 35 at the far upper side, follows the groove downward through the liquid bath 22 and then upward, and leaves the groove 35 near the top, being assisted along by the output guide rollers 39, 40.

The peripheral speeds of the input and output lower driven guide rollers 37 and 40 may be equal since the length of the tubing 10 after being radially expanded in the bath 22 is substantially equal to its length prior to its radial expansion. This will be discussed more fully. The peripheral speeds of the input and output driven guide rollers 37 and 40 are, of course, related to the speed of the rotating driven wheel 25.

That linear portion of the tubing which is in the circumferential groove 35 is transported or carried along by the driven rotating wheel 25. When the tubing in the groove 35 enters the heated liquid 22, its temperature rises and when the temperature of the tubing reaches its critical temperature, the tubing starts to expand radially under the influence of the gas pressure applied to its bore from source 12. By the time the tubing leaves the groove 35, it has attained its full desired radial expansion, and the expanded tubing 10E is delivered from the output side of the apparatus.

Referring now to FIGS. 3 and 4, when the tubing 10 of FIG. 3 expands radially to say twice its original diameter, as represented in FIG. 4 by the expanded tubing 10E, the tubing tries to expand equally in all radial directions about its original center axis. It is prevented from so doing by the walls of the V-shaped notch 35, and the center axis of the tubing is forced inward toward the hub of the wheel 25. This causes a tight frictional engagement to take place between the expanded tubing and the walls of the V-shaped groove 35 which is effective to prevent, or at least significantly reduce, the normal tendency of the material of tubing 10 to expand lengthwise in the presence of the heat supplied by the heated liquid 22.

Accordingly, the apparatus illustrated in FIGS. 1–4 is effective to expand plastic tubing radially without also extending the tubing in its lengthwise direction. It does this by (1) carrying the tubing through the heat zone free of any pulling or pushing forces in the axial direction, and (2) offering a frictional force opposing any attempt of the tubing to extend its length.

The apparatus illustrated in FIGS. 1–4 is suitable for radial expansion of tubing made of such material as polyethylene, polyvinyl chloride, and other polymeric materials which, when heated to a critical temperature, tend to expand in all directions, particularly if stressed in such directions.

The apparatus of FIGS. 1–4 is not, however, ideally suited for effecting radial expansion of polytetrafluoroethylene tubing, commonly referred to by its trade name Teflon. Teflon, instead of tending to expand in all directions when heated, tends to maintain its same volume. Thus, if pressure is applied to the bore of Teflon tubing and the tubing is heated to its critical temperature, the Teflon tubing will tend to contract in length. Apparatus suitable for radially expanding Teflon tubing is illustrated in FIGS. 5–7.

Referring now to FIGS. 5–7, the apparatus 120 there shown differs from the apparatus 20 of FIGS. 1–4 principally in that the Teflon tubing 110 is carried through the heated liquid 122 in a V-shaped circumferential groove 135 formed on the exterior (rather than the interior) surface of the wheel 125. In FIGS. 5–7, components having functions similar to those of the apparatus of FIGS. 1–4 are identified by similar reference numerals to which 100 has been added. For example, input guide rollers 136, 137 of the apparatus 120 of FIGS. 5–7 correspond to input guide rollers 36, 37 of the apparatus 20 of FIGS. 1–4. To faciliate initial looping of the Teflon tubing around the wheel 125, the wheel 125 is illustrated as being movable vertically, as by the cylinder and piston 150, to the dot-and-dash position shown in FIG. 5.

To simplify the drawing, the drive means for the wheel 125 have been omitted from FIG. 5, but any suitable means may be used. For example, the wheel may be driven by the electric motor 126 through a sprocket and chain arrangement, or a separate electric motor may be mounted on the shaft of the wheel 125.

FIG. 6 is a view in section looking down along the line VI—VI of FIG. 5 and shows the Teflon tubing 110 before it is immersed in the heated liquid bath 122. FIG. 7 is a view in section looking down along the line VII—VII of FIG. 5 showing the radially enlarged Teflon tubing 110E as it emerges from the heated bath. When the Teflon tubing 110 expands radially from the normal size shown in FIG. 6 to its radially expanded size shown in FIG. 7, the tubing tries to contract in length but is prevented from doing so by the wheel 125 and by the frictional resistance offered by the sides of the V-shaped groove 135. As explained in connection with FIGS. 1–4, this frictional resistance is developed when the tubing attempts to expand radially in all directions from its normal center axis.

FIGS. 8 and 9 depict, respectively, a piece of polyvinyl chloride tubing before and after radial expansion. It will be seen that the length of the tubing remains substantially the same. Moreover, when the radially expanded tubing is shrunk back to its original radial dimension, by the application of heat sufficient to raise the tubing to at least its critical temperature, the lineal shrinkage from its radially-expanded length is a very small percentage of its total length.

The following is a specific example of a process which was carried out using the method and apparatus of the present invention:

A polyvinyl chloride tubing having an original I.D. (inside diameter) of 0.119" and a wall thickness of 0.022" was passed through a water bath using the apparatus of FIG. 1. The temperature of the bath was 205° F. The rate of movement of the tubing through the bath was 12.5 feet per minute. The air pressure applied was 76 lbs. per square inch. The tubing expanded to 0.257" I.D. and a wall thickness of 0.011". Subsequently, when the radially expanded tubing was shrunk back to its original I.D., the tubing shrunk only about 2.5% in its lineal dimension.

It will be understood that the size to which the tubing is expanded radially by the apparatus of FIGS. 1 and 5 is a function of a number of factors including the material of which the tubing is made, the temperature of the bath, the rate of movement of the tubing through the bath, and the pressure applied to the bore of the tubing. In general, the higher the temperature of the bath, the lower the pressure required. The pressure may be either gas or liquid, and may be applied to either end of the tubing. The heating medium may be either a water or oil bath or any other suitable medium. Expansion of the tubing takes place while the tubing is within the heating medium. The important aspects of the method and apparatus are (1) the tubing is transported or carried through the heating medium; it is not pulled or pushed through; and (2) the tubing is locked against lineal movement relative to the transporting means; specifically, in the apparatus illustrated, the tubing is locked frictionally in the V-groove of a transport drum or wheel.

By the apparatus shown and described, we are able to produce pre-stressed shrinkable tubing which when exposed to its critical temperature will shrink radially to about 50% of its expanded radial dimension, but in so doing shrinks less than 5% in its lineal dimension.

The apparatus of FIGS. 1 and 5 is adapted to a continuous operation in which long lengths of tubing may be expanded radially to 200% and more of its original radial dimension with but very small change (less than 10%) in lineal dimension.

While the preferred embodiment of this invention has been described in some detail, it will be obvious to one skilled in the art that various modifications may be made without departing from the invention as hereinafter claimed.

Having described our invention, we claim:

1. Apparatus for producing expanded shrinkable plastic tubing, said apparatus comprising: a heating chamber; means for heating said chamber; means for applying pressure to the bore of the tubing to be expanded; and transport means for transporting the pressurized tubing through the heating chamber to expand said tubing radially, said transport means comprising a drum so mounted for rotation that at least its peripheral portion moves rotatably through said heating chamber, said drum including locking means for locking said tubing to said drum and for opposing change in the lineal dimension of said transported tubing as it expands radially, said locking means comprising a circumferential angle-shaped notch on the inner peripheral surface of said drum for receiving said tubing.

2. Apparatus for producing expandable shrinkable plastic tubing, said apparatus comprising: a chamber containing a liquid bath; means for heating said liquid bath; a cylindrical structure mounted for rotation and at least partially immersed in said liquid bath, said cylindrical structure having on its inner peripheral surface a circumferential groove having inwardly sloping sides; means for applying pressure to the bore of the tubing to be expanded; means for guiding said tubing into said groove; and drive means for driving said cylindrical structure rotationally, thereby to carry the pressurized tubing through the heated liquid bath substantially free of applied pushing or pulling forces in the axial direction of the tubing, whereby when said tubing expands radially frictional forces are developed which oppose expansion of said tubing in its axial direction.

References Cited by the Examiner
UNITED STATES PATENTS 2,200,735   5/1940   Battin _____ 18—6
3,086,242   4/1963   Cook et al. _____ 18—19

J. SPENCER OVERHOLSER, *Primary Examiner.*

W. L. McBAY, *Assistant Examiner.*